(12) United States Patent
Kimoto (10) Patent No.: US 8,194,336 B2
(45) Date of Patent: Jun. 5, 2012

(54) LENS DRIVING DEVICE

(75) Inventor: Shinsuke Kimoto, Okayama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/024,611

(22) Filed: Feb. 10, 2011

(65) Prior Publication Data

US 2011/0199694 A1 Aug. 18, 2011

(30) Foreign Application Priority Data

Feb. 15, 2010 (JP) ................................. 2010-029767

(51) Int. Cl.
*G02B 7/02* (2006.01)
(52) U.S. Cl. ................... 359/824; 359/814; 348/208.11; 348/345
(58) Field of Classification Search .................. 359/813, 359/814, 822–824; 348/208.11, 345; 369/44.14–44.16; 396/529; 310/14
See application file for complete search history.

(56) References Cited

U.S. PATENT DOCUMENTS

| | | | | |
|---|---|---|---|---|
| 5,706,272 A * | 1/1998 | Ezawa | ........................... | 720/676 |
| 7,663,818 B2 * | 2/2010 | Chung | ........................... | 359/814 |
| 7,663,823 B2 * | 2/2010 | Chung | ........................... | 359/824 |
| 7,826,157 B2 * | 11/2010 | Chen et al. | ...................... | 359/824 |
| 8,068,295 B2 * | 11/2011 | Park et al. | ...................... | 359/824 |

FOREIGN PATENT DOCUMENTS

JP   2008-033252   2/2008

* cited by examiner

*Primary Examiner* — Loha Ben
(74) *Attorney, Agent, or Firm* — Panasonic Patent Center; Dhiren Odedra; Kerry Culpepper (57) ABSTRACT

A lens driving device has a carrier, a coil, an upper spring, a lower spring, a yoke, a magnet, and a lower member. The carrier is cylindrical and has a hollow part along a vertical direction so that a lens can be carried. The coil is fixed to an outer peripheral surface of the carrier. The upper spring is arranged over the carrier, and fixed to the yoke. The lower spring is arranged below the carrier. The yoke is formed into a box shape having a side wall and an opening on the lower side, and arranged around the carrier. The magnet is arranged in the yoke so as to be opposed to the coil. The lower member is arranged below the yoke. The lower member has a projection part connected to the yoke. The projection part is inserted between an inner surface of the side wall of the yoke and an outer surface of the magnet and connected to the yoke. Thus, the yoke and the lower member can be connected such that space for the magnet to be arranged in the yoke is less affected.

12 Claims, 8 Drawing Sheets

LENS DRIVING DEVICE

BACKGROUND OF THE INVENTION

1. Field of the Invention

The present invention relates to a lens driving device of a small camera mounted on a mobile phone or the like.

2. Description of the Related Art

Recently, mobile phones have become widely used, and their functions are improved, and the one provided with a small camera enters the mainstream. Hereinafter, a lens driving device of the small camera will be described with reference to the drawings (e.g., refer to, Unexamined Japanese Patent Publication No. 2008-33252).

Figure 9:
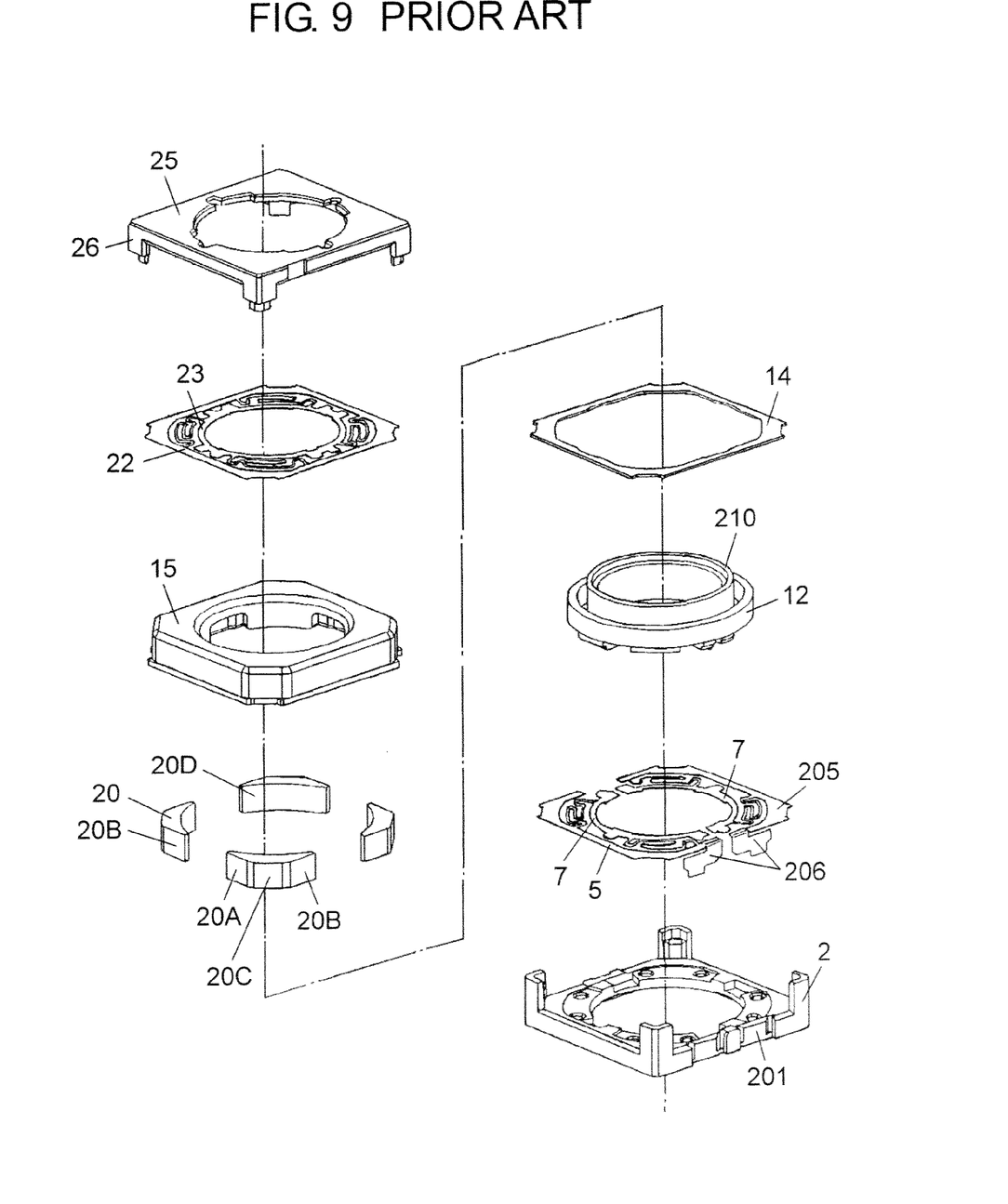
FIG. 9 shows an exploded perspective view of a conventional lens driving device.
Figure 10:
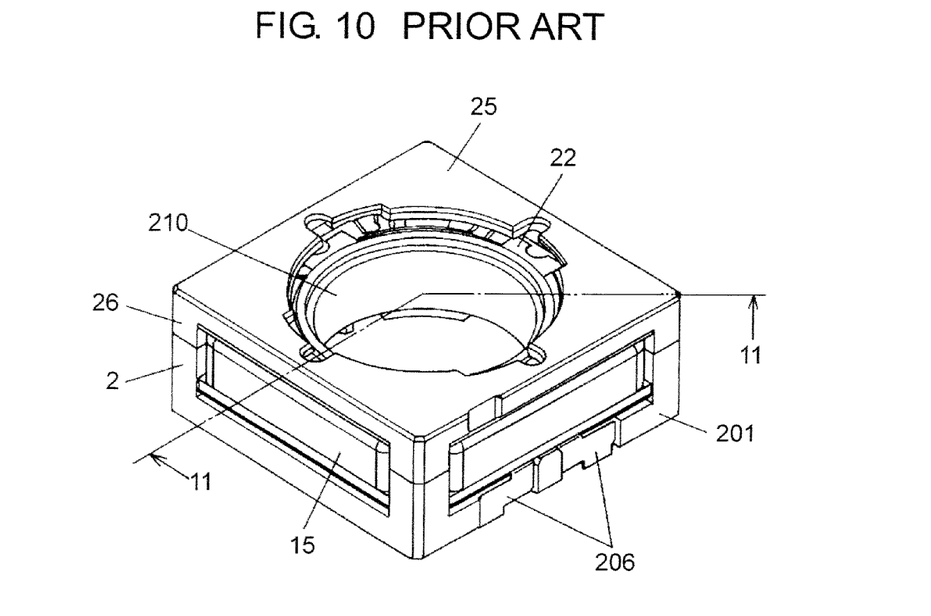
FIG. 10 shows an external perspective view of the conventional lens driving device.
Figure 11:
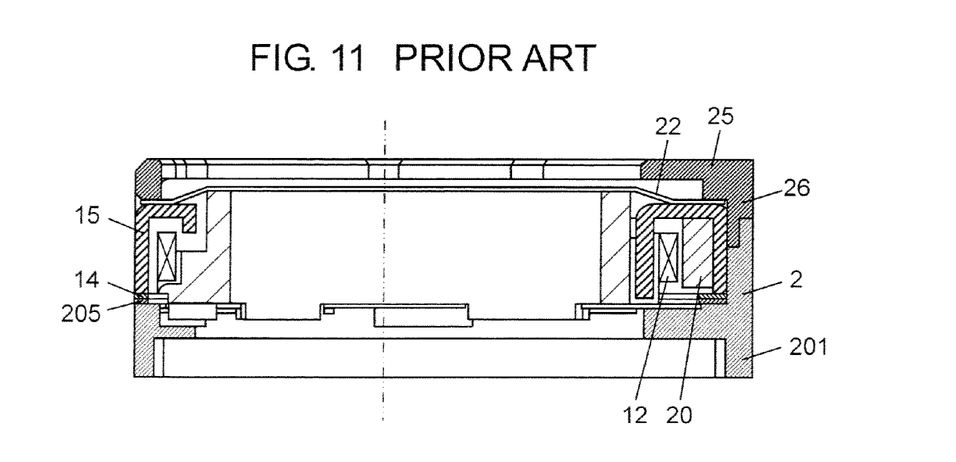
FIG. 11 shows a cross-sectional view of the conventional lens driving device.

FIG. 9 is an exploded perspective view of a conventional lens driving device. FIG. 10 is an external perspective view of the conventional lens driving device. FIG. 11 is a cross-sectional view of the conventional lens driving device. In addition, FIG. 11 is a simplified cross-sectional view taken along line 11-11 in FIG. 10. This lens driving device has base 201, lower spring 205, carrier 210, coil 12, yoke 15, insulation spacer 14, magnet 20, upper spring 22, and cover member 25.

Base 201 is formed into a rectangular shape in a top view, and has a hole in its center. First projection 2 is formed to be integral with base 201 and extends upward from an upper surface of each one of four corners of base 201. Base 201 is made of an insulating resin.

Two lower springs 205 are arranged on the upper surface of base 201 so as not to be overlapped with each other, and electrically independent to each other. A surrounding part of lower spring 205 is fixed to base 201. A part of the surrounding part is bent downward to provide terminal 206. In addition, two elastic arms are formed so as to extend between the surrounding part and lower holding part 7. Lower holding part 7 of lower spring 205 is fixed to a lower part of carrier 210.

Carrier 210 is roughly cylindrical. Annular coil 12 is fixed to an outer periphery of carrier 210. Respective end parts of a wire of coil 12 are connected to respective lower springs 5. Insulation spacer 14 is put on lower spring 205. Yoke 15 is formed into a roughly octagonal shape, in a top view, which is provided by chamfering corner parts of a rectangle. Yoke 15 is formed into a box shape having an opening on the lower side. Yoke 15 is put on insulation spacer 14. Yoke 15 houses carrier 210 to which coil 12 is fixed, on the inside of its outer walls. Four magnets 20 are fixed on the inside of the four chamfered corner parts of yoke 15, respectively.

Magnet 20 has, in a top view, first outer surface 20A, second outer surface 20B, and third outer surface 20C which are opposed to three inner surfaces of the adjacent outer walls at each one of the four corners of yoke 15. In addition, arc-shaped surface 20D is provided on the inner side so as to connect first outer surface 20A to second outer surface 20B provided on both ends of third outer surface 20C. Thus, each magnet 20 is bonded and fixed to yoke 15 in such a manner that first to third outer surfaces 20A to 20C abut on the three inner surfaces of the adjacent outer walls of yoke 15, respectively. In the fixed state, each magnet 20 is configured such that the north pole (or south pole) is provided on the side of arc-shaped surface 20D in an entire height direction, and the south pole (or north pole) is provided on the sides of first to third outer surfaces 20A to 20C in an entire height direction. That is, it is configured such that the different poles are provided between the side of arc-shaped surface 20D and the sides of first to third outer surfaces 20A to 20C. Arc-shaped surface 20D of magnet 20 is opposed to the outer periphery surface of coil 12 with some space therebetween.

Upper spring 22 is arranged on an upper surface of yoke 15. Upper spring 22 is provided with four elastic arms extending from its outer frame part toward its inner periphery side and having the same shape. One end of the elastic arm is connected to upper holding part 23 formed into a circular ring. Upper holding part 23 is fixed to an upper part of carrier 210.

Cover member 25 is arranged on upper spring 22. Cover member 25 is formed into a rectangular shape in a top view, and has a hole in the center. Second projection 26 is formed to be integral with cover member 25 and extends downward from each one of four corners thereof. Cover member 25 is made of an insulating resin. An outer frame part of upper spring 22 is fixed between cover member 25 and yoke 15.

Second projection 26 of cover member 25 and first projection 2 of base 201 are positioned outside the chamfered corner position of yoke 15. Upper second projection 26 and lower first projection 2 vertically abut on each other, and their abutment parts are bonded and fixed to each other. Similarly, four second projections 26 and four first projections 2 are all bonded and fixed, respectively.

The conventional lens driving device configured as described above is mounted on equipment after a lens barrel having a lens is mounted on carrier 210.

When a voltage is applied between terminals 206 of two lower springs 205, a current flows in coil 12. Thus, a current flows in coil 12 in a direction perpendicular to magnetic flux from magnet 20. As a result, force acts on coil 12 in the vertical direction as the current flows. Thus, carrier 210 fixed to coil 12 is moved in an upper direction or a lower direction (optical axis direction). Carrier 210 is moved and stopped in an upper position or a lower position in which spring force of the elastic arm of lower spring 205 is proportional to that of upper spring 22. By controlling the voltage applied between terminals 206, that is, the current flowing in coil 12, the vertical movement of carrier 210 can be controlled. As a result, a position of the lens barrel integral with carrier 210 can be adjusted.

Yoke 15 has the roughly octagon shape provided by chamfering its rectangle corner parts, in the top view. Second projection 26 of cover member 25 abuts on and bonded to first projection 2 of base 201 on the outside of the chamfered corner part. However, in this configuration, first projection 2 and second projection 26 are bonded to each other only at their end faces in the vertical direction. In order to obtain predetermined bonding strength, an area of the bonded part has to be surely ensured, so that it is necessary to thicken first projection 2 and second projection 26. However, to thicken second projection 26 and first projection 2, the chamfered part of yoke 15 needs to be large, so that space in yoke 15 is reduced due to the chamfered part. Thus, it is difficult to ensure the space for magnet 20 to be arranged in yoke 15.

SUMMARY OF THE INVENTION

A lens driving device according to the present invention has a carrier, a coil, an upper spring, a lower spring, a yoke, a magnet, and a lower member. The carrier is cylindrical and has a hollow part along a vertical direction so that a lens can be carried. The coil is fixed to an outer peripheral surface of the carrier. The upper spring is arranged over the carrier, and fixed to the yoke. The lower spring is arranged below the carrier. The yoke is formed into a box shape having a side wall and an opening on the lower side, and arranged around the carrier. The magnet is arranged in the yoke so as to be opposed to the coil. The lower member is arranged below the yoke. The lower member has a projection part connected to the yoke.

The projection part is inserted between an inner surface of the side wall of the yoke and an outer surface of the magnet and connected to the yoke.

In this configuration, the yoke and the another component can be connected such that the space for the magnet to be arranged in the yoke is less affected.

DETAILED DESCRIPTION OF THE INVENTION

Figure 1:
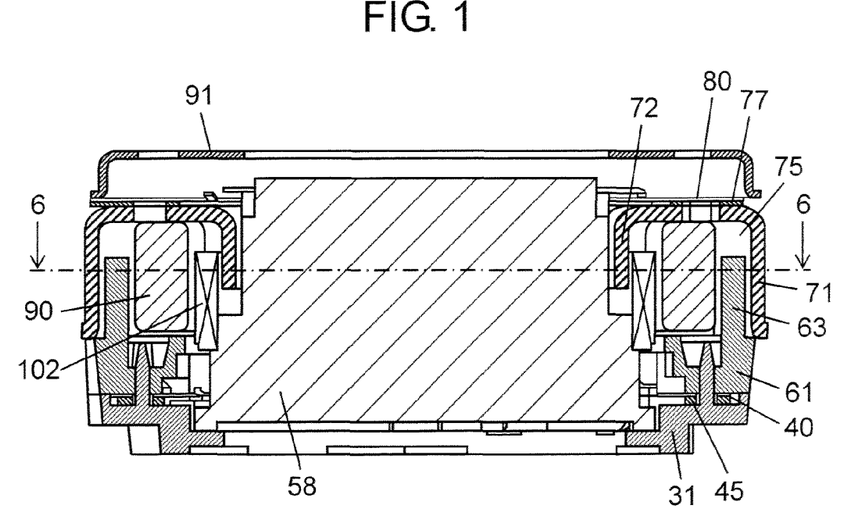
FIG. 1 shows a cross-sectional view of a lens driving device according to an embodiment of the present invention.
Figure 2:
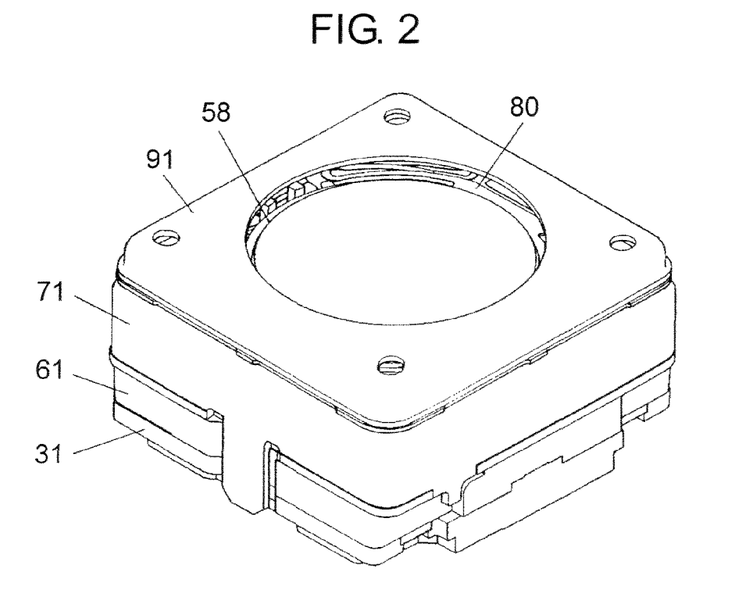
FIG. 2 shows an external perspective view of the lens driving device according to the embodiment of the present invention.
Figure 3:
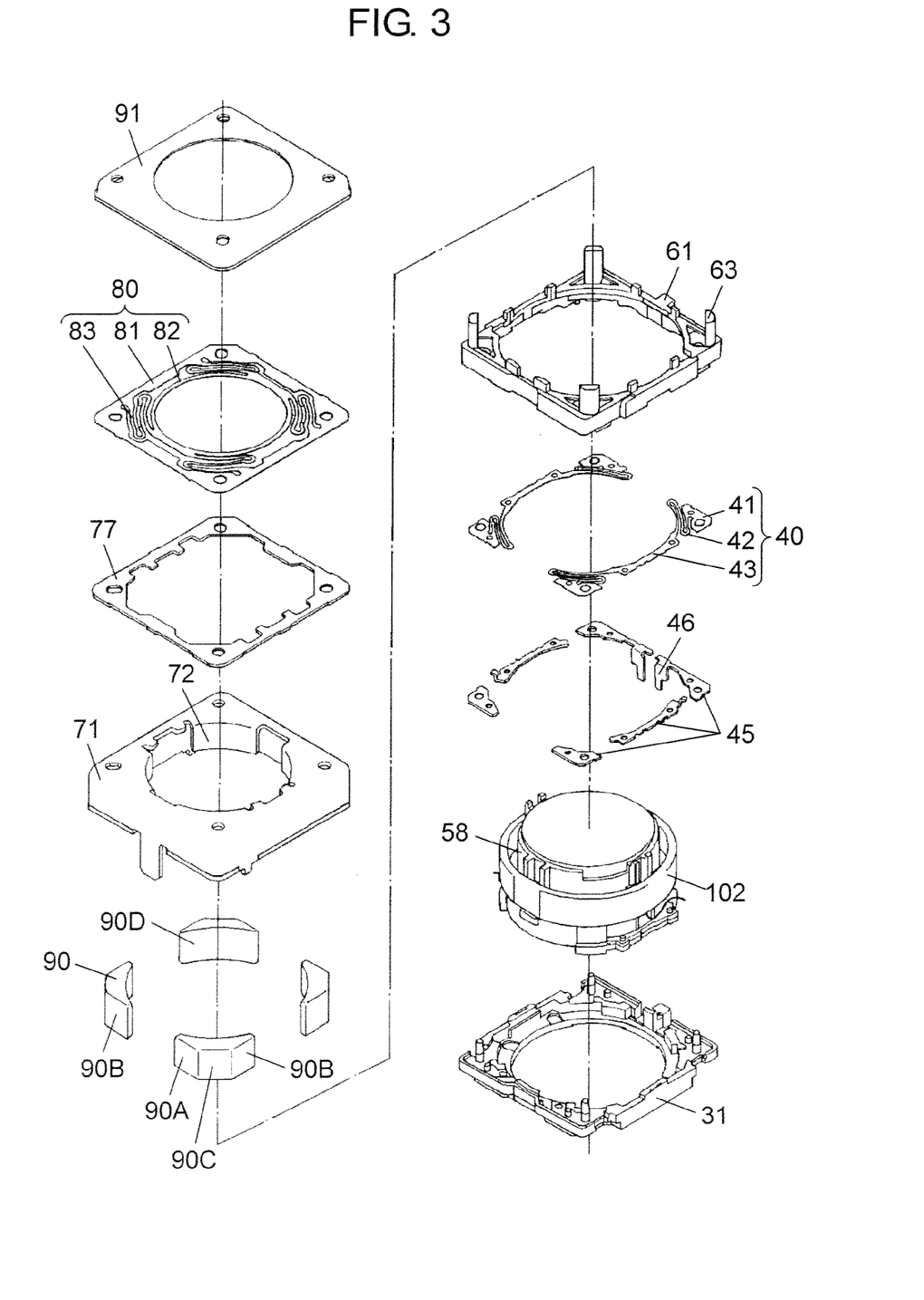
FIG. 3 shows an exploded perspective view of the lens driving device according to the embodiment of the present invention.
Figure 4:
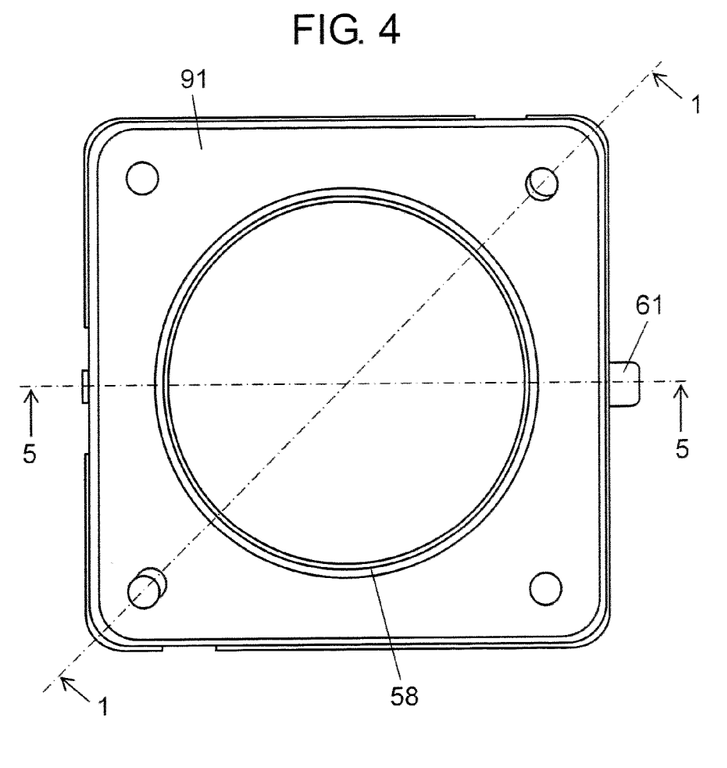
FIG. 4 shows a top view of the lens driving device according to the embodiment of the present invention.
Figure 5:
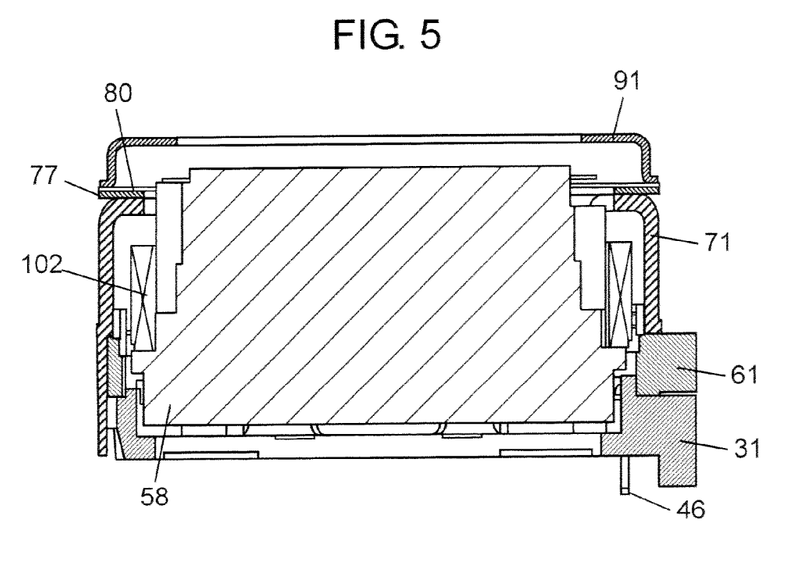
FIG. 5 shows a cross-sectional view of the lens driving device according to the embodiment of the present invention taken along line 5-5 in FIG. 4.
Figure 6:
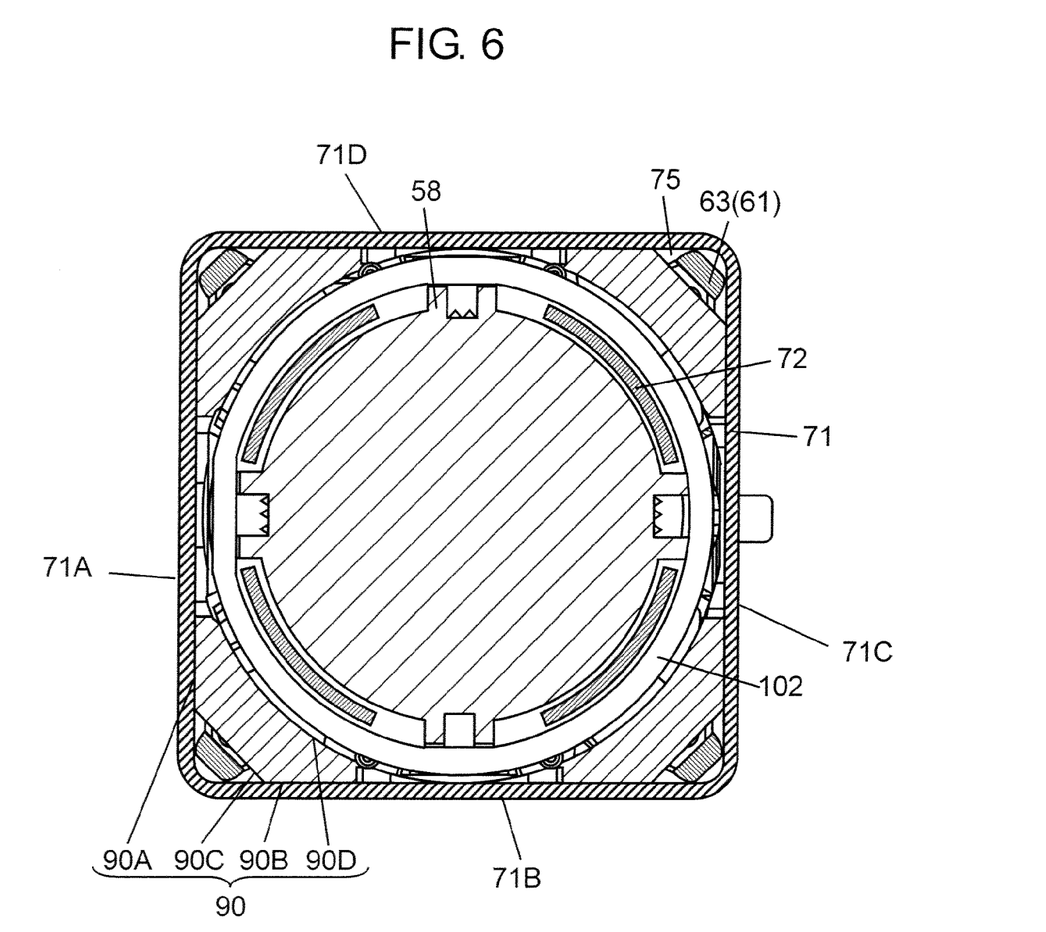
FIG. 6 shows a horizontal cross-sectional view of the lens driving device according to the embodiment of the present invention taken along line 6-6 in FIG. 1.

FIG. 1 is a cross-sectional view of a lens driving device according to an embodiment of the present invention. FIG. 2 is an external perspective view of the lens driving device according to the embodiment of the present invention. FIG. 3 is an exploded perspective view of the lens driving device according to the embodiment of the present invention. FIG. 4 is a top view of the lens driving device according to the embodiment of the present invention. FIG. 5 is a cross-sectional view taken along line 5-5 in FIG. 4. FIG. 6 is a horizontal cross-sectional view taken along line 6-6 in FIG. 1. In addition, FIG. 1 is a view showing a cross-section taken along line 1-1 in FIG. 4.

The lens driving device has base 31, carrier 58, coil 102, upper spring 80, lower spring 40, yoke 71, magnet 90, reinforcing plate 45, plate 77, and spacer member 61 serving as a lower member. Carrier 58 is cylindrical, and has a hollow part formed along a vertical direction so that a lens can be carried. Coil 102 is fixed to an outer peripheral surface of carrier 58. Upper spring 80 is arranged over carrier 58. Lower spring 40 is arranged below carrier 58. Yoke 71 is formed into a box shape having a top surface, a side wall, and an opening on the lower side, and is arranged around carrier 58. Magnet 90 is arranged in yoke 71 so as to be opposed to coil 102. Spacer member 61 is arranged below yoke 71. Spacer member 61 has projection part 63 connected to yoke 71. Projection part 63 is inserted between an inner surface of the side wall of yoke 71 and an outer surface of magnet 90 and connected to yoke 71.

Base 31 is formed into a rectangular shape in a top view, and has a hole in its center. Base 31 is made of a resin.

Two lower springs 40 are independently fixed to an upper surface of base 31 so as to be line-symmetric to each other with respect to a line passing through the center of base 31 in the top view. As shown in FIG. 3, lower spring 40 has fixed part 41, elastic arm 42, and arc-shaped holding part 43. Fixed part 41 is provided at each end of lower spring 40 so as to correspond to each corner position of base 31. Elastic arm 42 extends inward from each fixed part 41. Holding part 43 is formed between elastic arms 42. Lower spring 40 is made of a thin-plate spring material. Reinforcing plate 45 made of metal is integrally connected to fixed part 41 and holding part 43 from the lower side. Terminal 46 projecting downward is formed at one end of reinforcing plate 45 integral with fixed part 41. Each fixed part 41 of lower spring 40 is fixed to base 31 with reinforcing plate 45 interposed therebetween. In a state where lower spring 40 is fixed to base 31, terminal 46 projects below base 31 (see FIG. 5). Each holding part 43 is fixed to a lower part of carrier 58. Each end of a wire of coil 102 fixed to the outer peripheral surface of carrier 58 is electrically and mechanically connected to each lower spring 40. Reinforcing plate 45 may be omitted in a case where sufficient strength can be ensured only with lower spring 40. In this case, a terminal projecting downward is provided in lower spring 40 and it serves as the same role as that of above-described terminal 46.

Spacer member 61 is arranged on lower spring 40. That is, fixed part 41 of lower spring 40 is sandwiched between upper spacer member 61 and lower base 31. Spacer member 61 is formed into a rectangular shape in a top view, similar to base 31. Projection part 63 projecting upward is formed at each of four corners of spacer member 61 on the upper side. Spacer member 61 is made of an insulating resin.

Magnet 90 is formed into a roughly trapezoidal shape in a top view. More specifically, magnet 90 has arc-shaped surface 90D, first outer surface 90A, second outer surface 90B, and third outer surface 90C, as side surfaces, in the top view. Arc-shaped surface 90D is positioned on the inner side of the lens driving device, and formed into an arc shape so as to correspond to a shape of coil 102. First outer surface 90A extends from one end of arc-shaped surface 90D. Second outer surface 90B extends from the other end of arc-shaped surface 90D, and is roughly orthogonal to first outer surface 90A. Third outer surface 90C is provided so as to connect first outer surface 90A to second outer surface 90B. In addition, each magnet 90 is configured such that the north pole (or south pole) is provided on the side of arc-shaped surface 90D in an entire height direction, and the south pole (or north pole) is provided on the sides of first to third outer surfaces 90A to 90C in an entire height direction. That is, it is configured such that the different poles are provided between the side of arc-shaped surface 90D and the sides of first to third outer surfaces 90A to 90C.

Yoke 71 is arranged over spacer member 61. Yoke 71 has a shape in which each one of four corners composed of the adjacent side walls is not largely chamfered. That is, it is roughly rectangular in a top view. Magnet 90 is bonded and fixed to each one of the four corners of yoke 71. As shown in FIG. 1, yoke 71 has inner wall part 72 bent and extending downward from the top surface so as to be parallel to arc-shaped surface 90D of magnet 90. Coil 102 is arranged between inner wall part 72 and arc-shaped surface 90D.

As shown in FIG. 6, each magnet 90 is arranged at each one of the four corners of yoke 71. Here, yoke 71 has side walls 71A, 71B, 71C, and 71D. One corner part of yoke 71 is formed by side wall 71A (first side wall) and side wall 71B (second side wall) which are adjacent to each other at roughly right angles. Here, the first side wall and the second side wall are not necessarily side wall 71A and side wall 71B, respectively, and they may be other combination (such as side wall 71B and side wall 71C) as long as they are adjacent to each other at roughly right angles. Thus, first outer surface 90A of magnet 90 is connected to side wall 71A. Similarly, second outer surface 90B is connected to side wall 71B. In this arrangement state, arc-shaped surface 90D of magnet 90 is opposed to an outer peripheral surface of coil 102 with some space therebetween. Space 75 having the opening on the lower side is formed in an area surrounded by third outer surface 90C of magnet 90 and side wall 71A and side wall 71B serving as the adjacent outer walls of yoke 71.

Projection part 63 of spacer member 61 is inserted into space 75, and bonded and fixed to yoke 71 with an adhesive agent (not shown) poured into space 75. That is, projection part 63 is inserted between inner surfaces of side walls 71A and 71B of yoke 71, and the outer surface of magnet 90 and connected to yoke 71. Here, as shown in FIG. 1, base 31 and spacer member 61 are connected to each other. Accordingly, yoke 71 and base 31 are connected.

In this configuration, spacer member 61 including a side surface of projection part 63 is bonded and fixed to yoke 71. Therefore, projection part 63 can be bonded and fixed to yoke 71 in a large area without being thickened so much, and also connected to base 31. That is, space for projection part 63 to be arranged to connect yoke 71 and spacer member 61 can be small in yoke 71. Therefore, space for magnet 90 to be arranged in yoke 71 can be less affected by that, so that the space for magnet 90 can be sufficiently ensured without having to increase a size of yoke 71.

In addition, projection part 63 is preferably connected to the side wall of yoke 71. More preferably, it is connected to at least the inner surface of first side wall 71A and the inner surface of side wall 72A. Thus, the connection area between projection part 63 and yoke 71 can be larger, and the space for projection part 63 can be smaller. As a result, yoke 71 can be smaller itself.

Metal plate 77 having a hole in its center and composed of one plate is fixed to an upper surface of yoke 71 by welding. Upper spring 80 is put on an upper surface of plate 77.

As shown in FIG. 3, upper spring 80 has surrounding part 81, ring-shaped part 82, and elastic arm 83. Surrounding part 81 is formed into a frame shape. Ring-shaped part 82 is formed inside surrounding part 81 so as to be roughly circular. Elastic arms 83 are provided in four positions so as to connect surrounding part 81 and ring-shaped part 82. Surrounding part 81 is fixed to plate 77 by welding. Ring-shaped part 82 is fixed to an upper part of carrier 58.

Metal plate frame 91 is put on surrounding part 81 of upper spring 80. Frame 91 is fixed to a position where frame 91, upper spring 80, plate 77, and yoke 71 are overlapped to each other, by welding. Thus, the lens driving device according to this embodiment is provided.

Next, a description will be made of an operation of the lens driving device in this embodiment. When a voltage is applied between a pair of terminals 46, a current flows in coil 102 in a direction perpendicular to magnetic flux from magnet 90. Thus, force acts on carrier 58 to which coil 102 is fixed, in an upper direction or a lower direction serving as an optical axis direction. Thus, carrier 58 is moved and stopped at an upper position or a lower position in which spring force by elastic arm 42 of lower spring 40 is proportional to spring force by elastic arm 83 of upper spring 80. That is, by controlling a current amount in coil 102, a movement amount of carrier 58 can be adjusted along the optical axis direction, and a position of a lens barrel integral with carrier 58 can be adjusted.

Figure 7:
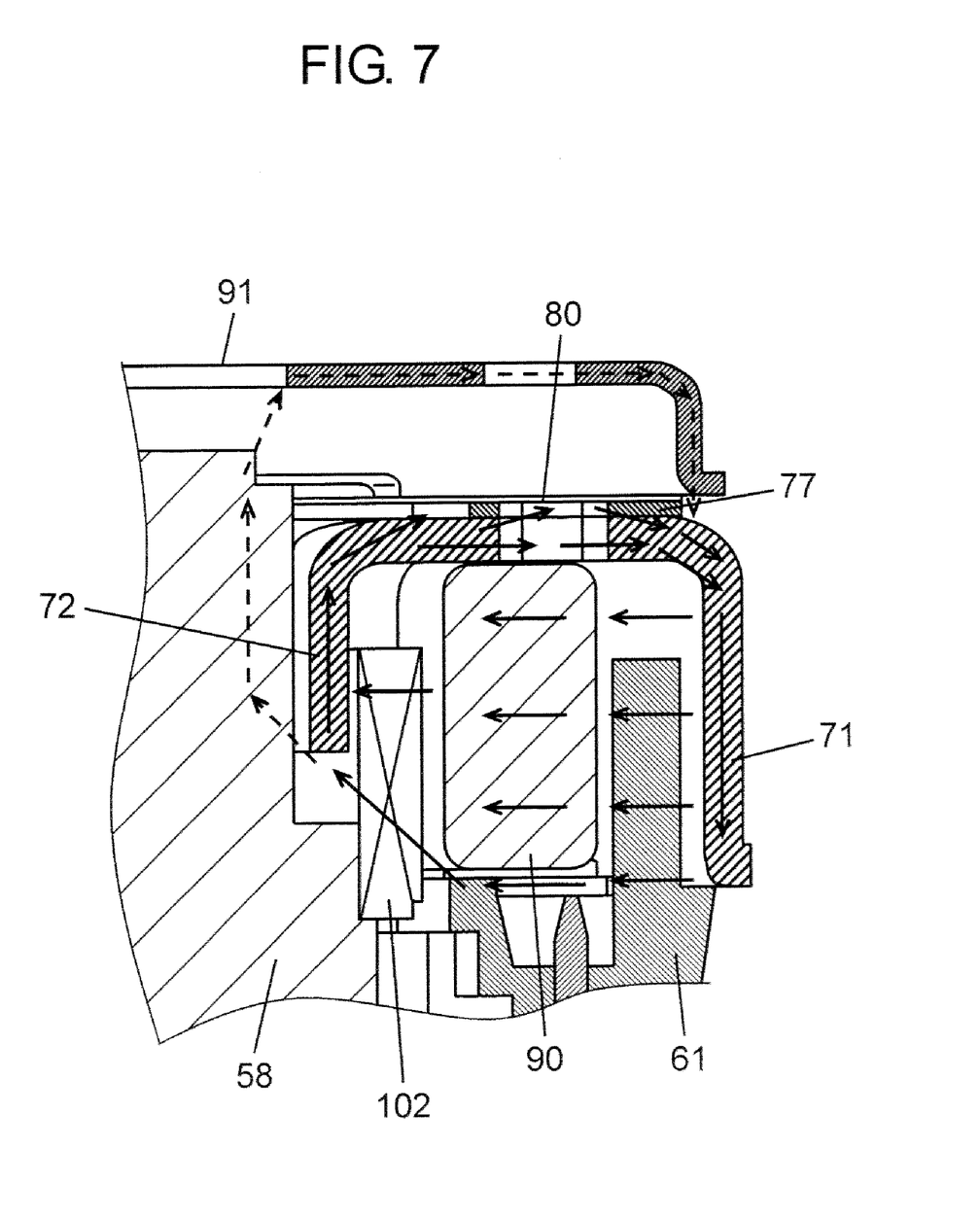
FIG. 7 shows a view for explaining a magnetic circuit configuration of the lens driving device according to the embodiment of the present invention.

Next, a description will be made of a configuration of a magnetic circuit in the lens driving device according to this embodiment, with reference to FIG. 7. As shown by solid-line arrows, the magnetic flux from magnet 90 passes through coil 102, reaches inner wall part 72 of yoke 71, then reaches the outer wall through the top surface part of yoke 71, and then returns to magnet 90. The magnetic circuit is composed of this passage (or reversed passage).

In the lens driving device according to this embodiment, metal plate 77 is arranged in overlapping manner on the top surface of yoke 71, and upper spring 80 is arranged thereon. In this configuration, the top surface part of yoke 71 is added in thickness due to plate 77, so that magnetic resistance is low as compared with a case where upper spring 80 is directly arranged on yoke 71. Accordingly, a magnetic flux amount increases. Furthermore, since frame 91 is also composed of the metal plate, as shown by dotted-line arrows in FIG. 7, magnetic flux leaked from yoke 71 can be collected by frame 91 and returned into the passage of the magnetic circuit. As a result, the magnetic flux amount flowing in the magnetic circuit can increase. Consequently, the force acting on carrier 58 in the vertical direction, that is, impelling force can increase when applying current.

Furthermore, in the configuration according to this embodiment, the space for magnet 90 to be arranged can be largely ensured in yoke 71, so that large magnet 90 can be used. Accordingly, the impelling force of carrier 58 can increase.

In addition, while the description has been made of the configuration in which projection parts 63 of spacer member 61 serving as the lower member are inserted in the four all corner parts of yoke 71 in this embodiment, the present invention is not limited to this configuration and may be applied to another configuration in which projection part 63 is inserted in at least one corner part of yoke 71 and connected to yoke 71.

Figure 8:
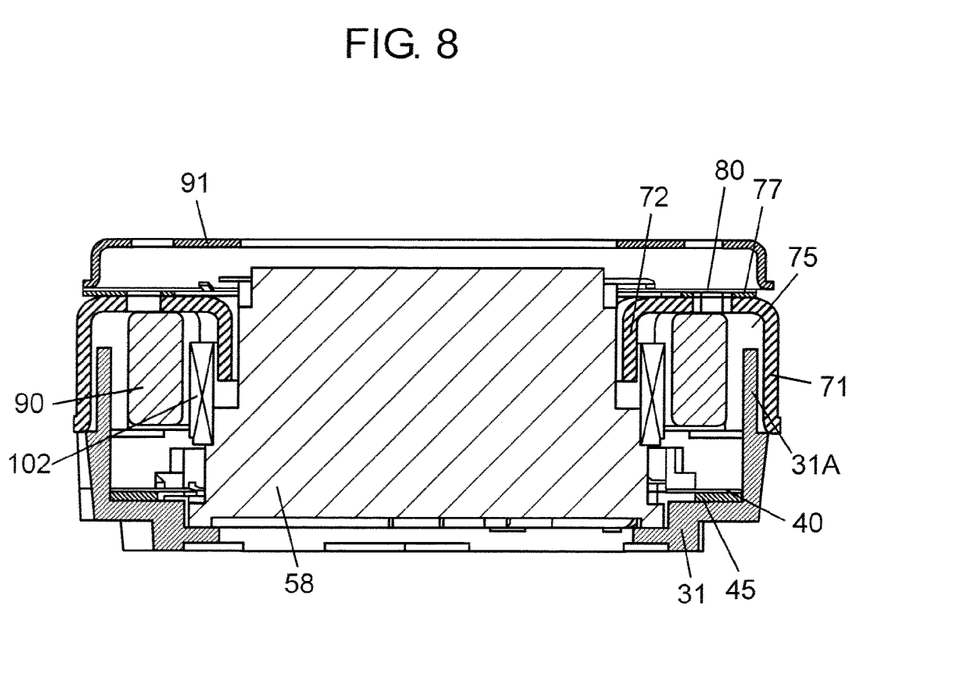
FIG. 8 shows a cross-sectional view of another lens driving device according to the embodiment of the present invention.

In addition, the description has been made of the case where spacer member 61 is provided as the lower member, the present invention is not limited to this. The lower member may be any member as long as it is provided below yoke 71. As shown in FIG. 8, for example, the present invention may be applied to a configuration in which base 31 is provided as the lower member, projection part 31A is provided in base 31, and projection part 31A is inserted into space 75 of yoke 71 and connected to yoke 71. In this case also, the part from base 31 to yoke 71 can be surely fixed. In this example, spacer 63 is not needed. However, since projection part 63 can be shorter when projection part 63 is provided in spacer member 61, the configuration is effective in view of strength as compared with the case where the projection part is provided in base 31.

In addition, when the shape of yoke 71 is roughly rectangular in the top view, the volume in yoke 71 is large, which is preferable because degrees of freedom of setting a shape, size, and position of magnet 90 can be increased, and space 75 can be easily set, but the present invention is not limited to this configuration. The position of magnet 90 is also not limited to the corner position. That is, the present invention is not limited only to the combination of the shapes described above, and can be applied to any configuration as long as space can be formed by preferably setting the shapes and positions of the yoke and the magnet.

Furthermore, while the description has been made of the configuration in which plate 77 is arranged in overlapping manner on yoke 71 to lower the magnetic resistance in the magnetic passage, the present invention can be applied to a configuration in which plate 77 is arranged on a part other than the top surface part of yoke 71. In addition, other than the configuration in which plate 77 is arranged in overlapping manner, the present invention can be applied to a configuration in which yoke 71 itself has a turned-back part to increase its thickness in the magnetic passage.

The lens driving device according to the present invention has a feature of implementing the configuration in which the yoke and another component member can be connected such that the space for the magnet to be arranged in the yoke can be less affected, and it is advantageously used in a small camera incorporated in a mobile phone and the like.

What is claimed is:

1. A lens driving device comprising:
   a cylindrical carrier having a hollow part along a vertical direction so that a lens can be carried;
   a yoke formed into a box shape having a side wall and an opening on a lower side of the yoke, and disposed around the carrier;
   a coil provided around an outer peripheral surface of the carrier;
   an upper spring disposed over the carrier, and fixed to the yoke;
   a lower spring disposed below the carrier;
   a magnet disposed in the yoke so as to be opposed to the coil; and
   a lower member positioned below the yoke,
   wherein the lower member has a projection part inserted between an inner surface of the side wall and an outer surface of the magnet and connected to the yoke.

2. The lens driving device according to claim 1, further comprising a base arranged below the lower spring,
   wherein the lower member is a spacer member, and
   the lower spring is fixed to the base.

3. The lens driving device according to claim 2, wherein
   the yoke has corner parts, and the projection part is inserted to at least one of the corner parts and connected to the yoke.

4. The lens driving device according to claim 3, wherein
   the projection part is connected to the side wall of the yoke.

5. The lens driving device according to claim 3, wherein
   the yoke has a first side wall and a second side wall roughly perpendicular to each other,
   the corner part is formed of the first side wall and the second side wall,
   the magnet has a first outer surface connected to an inner surface of the first side wall, a second outer surface connected to an inner surface of the second side wall, and a third outer surface formed between the first outer surface and the second outer surface, and the projection part is inserted into space surrounded by the third outer surface, the inner surface of the first side wall, and the inner surface of the second side wall and connected to the yoke.

6. The lens driving device according to claim 5, wherein
   the projection part is connected to at least the inner surface of the first side wall and the inner surface of the second side wall.

7. The lens driving device according to claim 1, wherein
   the lower member is a base arranged below the lower spring, and
   the lower spring is fixed to the base.

8. The lens driving device according to claim 7, wherein
   the yoke has corner parts, and the projection part is inserted to at least one of the corner parts and connected to the yoke.

9. The lens driving device according to claim 8, wherein
   the projection part is connected to the side wall of the yoke.

10. The lens driving device according to claim 8, wherein
    the yoke has a first side wall and a second side wall roughly perpendicular to each other,
    any one of the corner parts is formed of the first side wall and the second side wall,
    the magnet has a first outer surface connected to an inner surface of the first side wall, a second outer surface connected to an inner surface of the second side wall, and a third outer surface formed between the first outer surface and the second outer surface, and the projection part is inserted into space surrounded by the third outer surface, the inner surface of the first side wall, and the inner surface of the second side wall and connected to the yoke.

11. The lens driving device according to claim 10, wherein
    the projection part is connected to at least the inner surface of the first side wall and the inner surface of the second side wall.

12. The lens driving device according to claim 1, further comprising a metal plate between the yoke and the upper spring.

* * * * *